(12) United States Patent
Srivastava et al.

(10) Patent No.: US 8,145,624 B1
(45) Date of Patent: Mar. 27, 2012

(54) METHOD AND APPARATUS FOR ASSOCIATING METADATA WITH DATA

(75) Inventors: Divesh Srivastava, Summit, NJ (US); Ioannis Velegrakis, Trento (IT)

(73) Assignee: AT&T Intellectual Property II, L.P., Atlanta, GA (US)

( * ) Notice: Subject to any disclaimer, the term of this patent is extended or adjusted under 35 U.S.C. 154(b) by 333 days.

(21) Appl. No.: 11/591,304

(22) Filed: Oct. 31, 2006

(51) Int. Cl.
*G06F 7/08* (2006.01)
*G06F 17/30* (2006.01)

(52) U.S. Cl. ......... 707/714; 707/803; 707/715; 707/688

(58) Field of Classification Search ................. 707/102, 707/103 R, 2, 999.103, 999.102, 999.002, 707/713, 714, 803, 3, 10, 103, 999.003, 999.01, 707/715, 722, 104.1, 99.01, 999.107, 688
See application file for complete search history.

(56) References Cited

U.S. PATENT DOCUMENTS 7,457,797 B2 * 11/2008 Bestgen et al. ................. 707/2
2008/0177697 A1 * 7/2008 Barsness et al. ................. 707/2

* cited by examiner

*Primary Examiner* — James Trujillo
*Assistant Examiner* — Bruce Moser (57) ABSTRACT

Method and apparatus for associating at least one query expression to an original database table is described. In one example, a metadata table is added to a database, wherein at least one portion of the metadata table comprises the at least one query expression. Afterwards, the at least one query expression is associated to at least one value from at least one tuple belonging to a data table of the database.

12 Claims, 6 Drawing Sheets

A DATABASE WITH METADATA INFORMATION STORED IN REGULAR TABLES AS DATA.

FIG. 1

Customers — 210

| Name | Type | Loc | Phone Line | CircuitID |
|---|---|---|---|---|
| AFLAC | business | NJ | 4078417332 | 15-245-6983 |
| J.Lu | residence | NY | 2019394460 | 18-245-7363 |
| H. Ford | residence | NJ | 2159537607 | 35-245-7564 |
| AMEX | business | NY | 3178763540 | 08-343-5002 |
| NJC | business | NJ | 9730918327 | 18-981-5002 |
| BCT | business | NJ | 9734858504 | 16-273-6019 |
| ... | ... | ... | ... | ... |

Provenance — 220

| Rf1 | Source | IP | Protocol |
|---|---|---|---|
| q1 | NJDB | 147.52.7.8 | http |
| q2 | 3State | 148.62.1.11 | ftp |
| ... | ... | ... | ... | q1: select Name, Type, PhoneLine from Customers where Loc='NJ'
q2: select Loc, PhoneLine, CircuitID from Customers where Type='business'

Permissions — 230

| Rf2 | Users |
|---|---|
| q11 | Administrators |
| q12 | Guests |
| ... | ... | q11: select * from Provenance where IP LIKE '147.%'
q12: select Name from Customers where Loc='NY'

Technicians — 250

| Name | Contact | Company |
|---|---|---|
| W. Farkas | 4804978353 | AT&T |
| S. Gilbert | 3178757627 | Verizon |
| M. Henry | 8187167852 | AT&T |
| C. Urs | 7739735713 | AT&T |
| Y. James | 7344676191 | CISCO |

XJ — 240

| Qc | Qt |
|---|---|
| qA | qB |
| qC | qD |
| qE | qF |
| ... | ... | qA: select CircuitID from Customers where Type='residence'
qB: select * from Technicians where Company='CISCO'
qC: select PhoneLine, CircuitID from Customers whereType='business'
qD: select * from Technicians where Company='Verizon'
qE: select PhoneLine from Customers
qF: select * from Technicians where Company='AT&T'

A DATABASE WITH METADATA INFORMATION STORED IN REGULAR TABLES AS DATA.

| QTypeValues | | | | 510 |
|---|---|---|---|---|
| Qid | TblName | ColName | RId | |
| q1 | Provenance | Rf1 | 1101 | |
| q2 | Provenance | Rf1 | 1011 | |
| ... | ... | ... | ... | |

| AttrTbl | | 520 |
|---|---|---|
| Qid | AttrName | |
| q1 | Name | |
| q1 | Type | |
| q1 | PhoneLine | |
| q2 | Loc | |
| q2 | PhoneLine | |
| q2 | CircuitID | |
| ... | ... | |

FIG. 5

ITName

| v | q | c |
|---|---|---|
| AFLAC | q1 | 1 |
| H. Ford | q1 | 1 |
| NJC | q1 | 1 |
| BCT | q1 | 1 |

Customers

| Name | Type | ... |
|---|---|---|
| AFLAC | business | ... |
| J.Lu | residence | ... |
| H. Ford | residence | ... |
| AMEX | business | ... |
| NJC | business | ... |
| BCT | business | ... |
| ... | ... | ... |

Provenance

| Rfl | Source | ... |
|---|---|---|
| q1 | NJDB | ... |
| q1 | 3State | ... |
| ... | ... | ... |

ITType

| v | q | c |
|---|---|---|
| business | q1 | 3 |
| residential | q1 | 1 |
| business | q2 | 4 |
| ... | ... | ... |

EQ

| R | A | t | q |
|---|---|---|---|
| Customers | Loc | NJ | q1 |
| Customers | Type | business | q2 |
| ... | ... | ... | ... |

METHOD AND APPARATUS FOR ASSOCIATING METADATA WITH DATA

BACKGROUND OF THE INVENTION

1. Field of the Invention

Embodiments of the present invention generally relate to database management applications and, more particularly, to a method and apparatus for associating metadata with data.

2. Description of the Related Art

In recent years there has been a tremendous proliferation of databases in many fields of endeavor, ranging from corporate environments and scientific domains to supporting a diverse set of applications on the web. These databases are becoming increasingly complex, both in their internal structure (e.g., thousands of tables) and in their interactions with other databases and applications (e.g., mediators and workflows). There is a consequent need for understanding, maintaining, querying, integrating and evolving these databases. In successfully performing these tasks, metadata information plays an important role. Metadata is any piece of information used to provide a more accurate view of the data and to enable a more efficient processing of it. Examples include schema information, integrity constraints, comments about the data, ontologies, quality parameters, annotations, provenance information, security policies, and statistical data characteristics. Metadata is used in many different fields.

As relational databases proliferate and become increasingly complex, both in their internal structure and in their interactions with other databases and applications, there is a growing need to associate a variety of metadata with the underlying data. Examples include comments, quality parameters, security policies, schema mappings, provenance information, etc. Over the years, numerous proposals have been made for augmenting the data model and the query capabilities of a database in order to facilitate metadata management, typically tailored to deal with specific kinds of metadata. Even though the need has been apparent, a simple, elegant approach to uniformly model and query both data and metadata has been elusive.

Thus, there is a need for a method and apparatus for associating data with metadata.

SUMMARY OF THE INVENTION

In one embodiment, a method and apparatus for associating at least one query expression is described. Specifically, a metadata table is added to a database, wherein at least one portion of the metadata table comprises the at least one query expression. Afterwards, the at least one query expression is associated to at least one value from at least one tuple belonging to a data table of the database.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 depicts an exemplary embodiment of a database with metadata information stored in tables as data in accordance with one or more aspects of the present invention;

DETAILED DESCRIPTION

In one embodiment, the present invention serves to accommodate in one framework the different kinds of metadata, the different structures, the different ways that metadata is associated with data, and the different ways in which metadata is used in queries. In order to achieve this, a framework that is simple and abstracted from the specifics of each kind of metadata is needed. Having observed that the operations one needs to perform on metadata are similar to those people do with data, the use of standard data management techniques for metadata can be implemented, so that both data and metadata can be managed in one single framework is presented. In one embodiment, the relational model is adequate for such a purpose. Metadata with complex structures can easily be modeled through relations and attributes. These relations have no special semantics, thus, the same piece of information can be viewed either as data or as metadata. It can also be queried using a relational query language, even independently of whether or not it is associated to some data.

The main mechanism used in the relational model to associate data in different relations is the join on one or more attributes. If data and metadata have been modeled as relations, the same mechanism can be used to describe the association between data and metadata. Unfortunately, the relational join operation has two main limitations that make it inadequate for this intended use. First, the association is always at the tuple level, i.e., it is not possible to associate a metadata tuple with only a subset of attributes of another tuple in a different table, since there is no way to specify the attributes that the metadata refers to. Second, it requires explicit association between the tuples through the join attributes. A "New York restaurants" comment, for instance, will have to be replicated and explicitly associated to each New York restaurant separately.

To cope with these issues, the use of queries as values in the relational tables is presented. In particular, attributes of type "query" are submitted as well as a demonstration of, how this can achieve the required functionality. The present invention raises such metadata to the level of data, and provides a unified mechanism for modeling and querying across data and metadata.

In one embodiment, the present invention can be summarized as follows:

1. Elevating metadata to first class citizens of the database and the query language, without requiring any special semantics. Introduction of metadata information is done simply by adding additional tables and associating them to the existing data tables. This enables metadata management without any modification of the semantics of the relational model and SQL, and without having to alter existing tables.

2. Extending the traditional join mechanism of the relational model to support joins that are based on a relation specified by a query stored in one of the attributes of each tuple, instead of on single values. This allows intentional specification of the data to which the metadata is associated. Furthermore, it allows metadata tuples to be associated to not just whole tuples, but also portions of them.
3. Presenting alternative implementation mechanisms that allow the use of queries as data values in modern relational databases and also allow joins based on such values. Pure rewriting-based strategies are presented, as well as techniques that can effectively use and update Query-indexes for this purpose.
4. Detailing the architecture of the MSF (Metadata Supporting Framework) system that has been prototyped.

Figure 1:
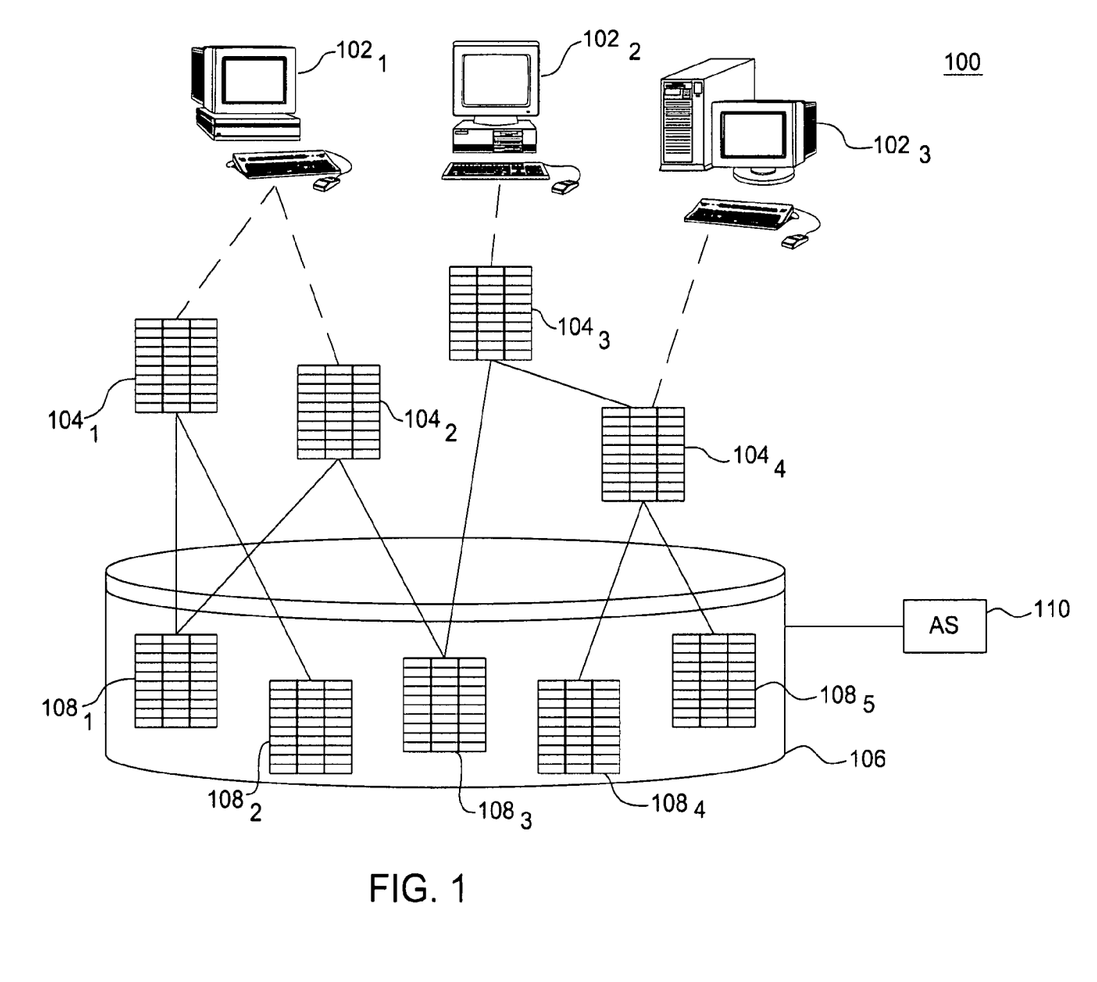
FIG. 1 is a block diagram depicting an exemplary embodiment of a database information system in accordance with one or more aspects of the present invention.

FIG. 1 illustrates a computer database management system 100 that includes a plurality of computers $102_{1...3}$ executing various applications, a plurality of views $104_{1...4}$, and a database 106 containing a plurality of base tables $108_{1...5}$. The computer system 100 may exist in any network environment that is well known in the art.

The plurality of computers $102_{1...3}$ may comprise a personal computer (PC), server, or the like. Each of these computers may be utilized to perform queries that access any one of the views shown in FIG. 1. Although only three computers are depicted, those skilled in the art realize that any number of computers may exist in the system 100.

The plurality of views $104_{1...4}$ (e.g., broadly defined as record tables) represent the tables that are displayed after a query is submitted to the database 106. The views contain tuples, (or database records) which in turn are made up of various database fields in their most basic form. Although only four views are depicted, those skilled in the art realize that any number of views may exist in the system 100.

The database 106 shown in FIG. 1 may comprise any conventional hardware or software based data organization and storage medium. The database 106 may be centrally located on a single computer or supported by a plurality of machines. In one embodiment, the database 106 is responsible for storing the plurality of base tables 108. A base table 108 is a database file that contains at least one tuple (i.e., a record). Each tuple contains at least one field. For example, a telephone book is analogous to a file, which contains a list of tuples (i.e., entries). Each of the entries comprises three fields: name, address, and phone number.

An application server 110 may be coupled to the database 106. The application server 110 may comprise a stand-alone server, computer, or like machine, or alternatively, a plurality of servers that may be utilized to accomplish at least one common task. Notably, the application server 110 may be configured to generate or modify certain metadata tables as described below.

The following section describes a realistic example that illustrates the need for a uniform way of managing different kinds of metadata and their association with data, and also presents how the present invention can satisfy the desired objectives.

Consider a communications company database with the table "Customers" 210 shown in FIG. 2. The table contains information about the phone lines (PhoneLine) of the customers (Name), their location (Loc), whether a customer is a business or a resident (Type) and the circuit (CircuitID) used by the phone line. The contents of the table are generated by integrating data from a number of physically distributed sources. When a mistake is detected in the table, it is important to know its origin in order to correct it. To make this information available to the user, the data in the Customers table needs to be annotated with metadata (e.g., its provenance information). This includes the origin database name (Source), its IP address (IP), and the communication protocol used to access it (Protocol). One way to achieve this is to alter the table Customers by adding three new columns for each of its attributes. Such a solution may affect the way existing applications use the table, may degrade performance, or may not even be possible to implement due to lack of authorization for such a change. An alternative solution is to store the provenance information in a separate table (Provenance) 220 as illustrated in FIG. 2. Column Rf1 can be used to specify the relationship between the specific tuple and the data it annotates. It may contain Name values assuming that Name is the key in Customers. For instance, tuple [BCT, NJDB, 147.52.7.8, http] in Provenance would indicate that the data tuple for the BCT customer was obtained from the NJDB source. This modeling approach has two main drawbacks. First, it has a lot of information repetition. Assume that it has been asserted that all the New Jersey customers originate from the same data source. To record that, a tuple like the one just mentioned will have to be repeated in table Provenance for every New Jersey customer. Furthermore, if a new New Jersey customer is inserted, the respective tuple will have to be created in Provenance for that customer. A trigger mechanism can save some manual effort, but access rights to table Customers may restrict one from doing so. The second drawback is that this mechanism cannot be used to model the fact that a Provenance tuple may not refer to the whole Customers tuple but only to a subset of its attributes.

In one embodiment, the present invention allows queries to be used as values in the table columns. In particular, to have some columns recording query expressions used to intentionally describe data a tuple is associated to. To find whether a particular data value is associated with a given (metadata) tuple, one only needs to check if the data value is part of the relation described by the query expression.

In the example database of FIG. 2, column Rf1 of table Provenance contains queries instead of atomic values. The first tuple with query q1 in column Rf1 intentionally describes that the provenance of all the customers with location 'NJ' is the NJDB data source. Furthermore, through the attributes of its "select" clause, it specifies that this is true only for attributes Name, Type and PhoneLine. It states nothing about attributes Loc and CircuitID. In a similar fashion, the second tuple specifies that data source '3State' is the origin of the Loc, PhoneLine and CircuitID values of all the New York and New Jersey business Customers.

Having the provenance information as a separate table comes with the additional advantage that it can be queried independently of the data it is associated to. For instance, in the case where a data administrator needs to know the set of data sources that have contributed data to the customer table, independently of what data that is, the data administrator can issue a query on the Provenance table. If the metadata was tightly coupled with the data, and embedded in the Customers table, retrieving that information would have been expensive since the data (customers) is generally much larger than its metadata (originating sources). The data administrator would have had to retrieve all the Customers data, and from each to select its source.

In one embodiment of the present invention, one can easily introduce new metadata on top of other existing metadata. It is only a matter of creation of a new table and of specifying the right queries as values in one of its columns. Also, different metadata tuples in the same metadata table can refer to different data or metadata tables. These are important features since the distinction between data and metadata is usually blurred. The same piece of information may be viewed as data by one application and as metadata by another.

In another example, assume that a set of metadata (e.g., security policies) need to be specified for some of the data. For simplicity of exposition, assume that these policies include only the group of users who can access the relevant data. The system administrator would like to annotate both the Customers and Provenance tables with the access permissions information. To achieve it, the administrator creates a new Permissions table 230 as illustrated in FIG. 2. The first tuple of that table, through query $q_{11}$ stored as a value in column Rf2, indicates that records in the Provenance table whose IP is in the "147." domain can be accessed only by an administrator. The second tuple, through query $q_{12}$, indicates that the Name field of records in the Customers table with location 'NY' can be accessed by a guest user.

In yet another example, the data in table Customers often needs to be verified for their consistency. This is common practice in large database applications where errors appear frequently. In the current application, this is done by a number of technicians from various companies. Not all technicians are qualified to verify the correctness of every data element in the Customers table. There are certain rules that govern this qualification. For example, any CISCO technician can verify that the circuit id recorded in the database for any residential customer is correct, any VERIZON technician can verify the correctness of the recorded phone number or circuit id (or their association) of any business customer, and any AT&T technician can verify the correctness of the phone number of any customer.

The owner of the database would like to annotate the data in the Customers table with the technicians that are eligible for performing the verification task, so that given some data values, it is easy to find who can be called to perform the verification. To do that, the technician information is recorded in a new database table Technicians 250. The relationship between technicians and customers is modeled through a new table XJ 240 with columns Qc and Qt, both containing queries as values. Their contents are presented in FIG. 2. The tuples in the table model the three rules just mentioned.

It is also important to know that through the proposed modeling of metadata information as data, and of the associations between tables through attributes with queries as values, metadata can have any complex structure. Being represented as separate tables, a piece of metadata information may have multiple columns with different types.

Figure 3:
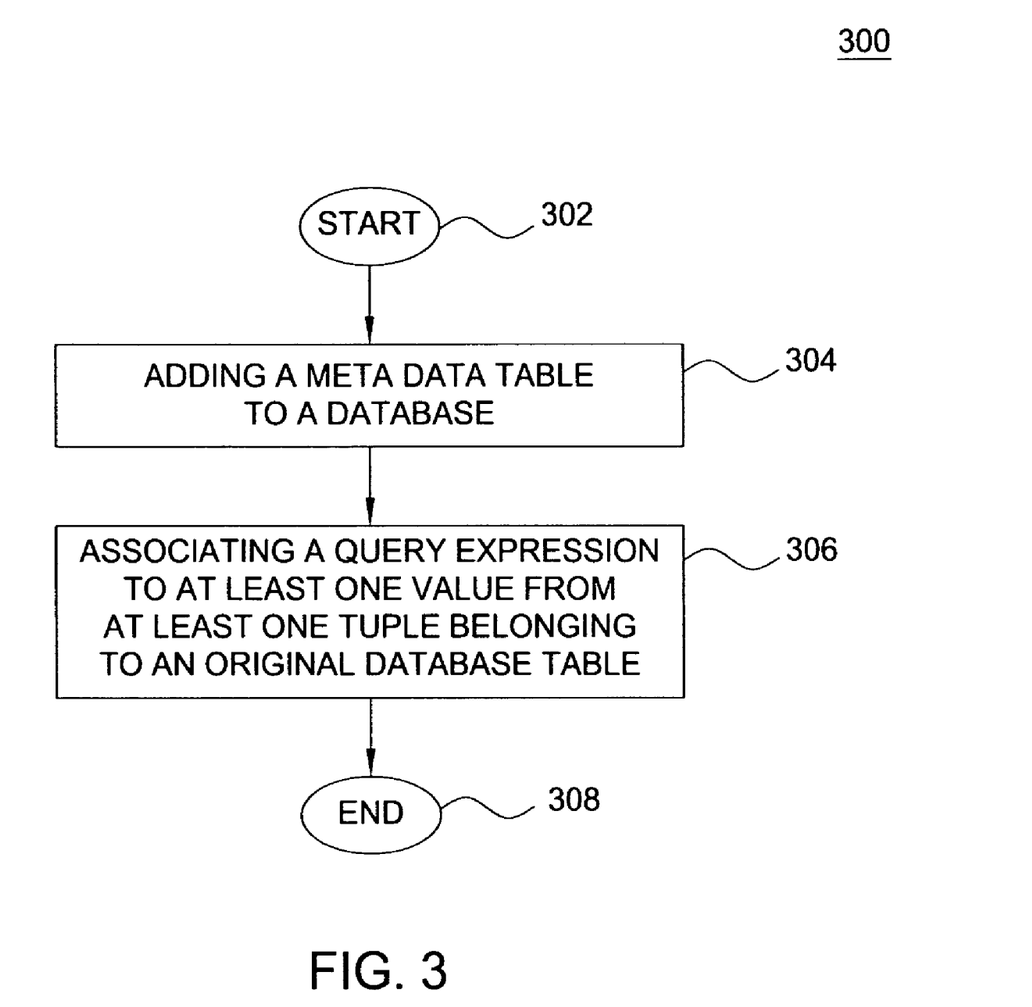
FIG. 3 a method for associating at least one query expression in accordance with the present invention.

FIG. 3 illustrates a method 300 for associating at least one query expression to a database table in accordance with the present invention (e.g., the examples described above). Method 300 begins at step 302 and proceeds to step 304 where at least one additional table is added. In one embodiment, a metadata table is added to an existing database that contains a plurality of database tables containing data (broadly defined as data tables). The metadata table is similar in form to the existing database tables. Specifically, the metadata table comprises different attributes, or fields (e.g., table column headers). For example, the "Name", "Contact", and "Company" fields in the "Technicians" table in FIG. 2 are attributes. The information contained under each attribute comprises values. In a metadata table, some of these values comprise queries (e.g., see "Provenance", "Permissions", and "xJ" tables in FIG. 2).

At step 306, at least one value (e.g., a query) added to the metadata table is associated to at least one of the existing database tables in the database. In one embodiment, the metadata table is associated to an existing database. In one embodiment, this is accomplished by specifying a relationship by using a "select clause" (see FIG. 2). The select clause corresponds with the query expression and specifies certain attributes from a designated table. The method 300 ends at step 308.

The semantics and the use of query expressions as data values and the operators on them are now described. The adopted type system is the one of the relational model extended with a new user defined atomic type called Query-type. Query-types provide the means to store queries as values in relational tables. User defined types are used the same way as any other primitive atomic type is used. The ability to define and use such types is part of the SQL Standard and is currently supported by most commercial database management systems. A Query-type value q is a relational query expression.

To be able to dynamically execute queries stored as values, the existence of a function eval, whose role is to evaluate a query expression that is provided to it as argument, is assumed.

In one embodiment, consider the query select * from Provenance applied on the database instance of FIG. 2. If the Query column Rf1 is evaluated prior to retrieval, as happens in other approaches that have also considered queries as values, the result will be a relation with the last three attributes of Provenance table and the attributes returned by the execution of the query in column Rf1. Queries $q_1$ and $q_2$ are not union-compatible (i.e., they have different select clauses). Consequently, in the execution of query select * from Provenance, if an unnest operation is applied on the returned result relation of queries $q_1$ and $q_2$, the final result will have tuples with different number and kind of attributes, hence, it would not be a relation.

The only additional functionality that is needed is a new kind of predicate (i.e., conditional expression) that makes use of the eval function. Such a predicate can be a parameter of the standard operators of relational algebra, including selection and join, yielding functionality that can effectively use Query-type values for associating metadata tables with data (or other metadata) tables, as described next.

The functionality described here can also be achieved in the nested relational model, where a whole relation is stored as a value of an attribute. That model is much more powerful, but unfortunately, its richer functionality comes with a higher cost. One goal of the present invention is to achieve what is desired while avoiding that extra cost. For that, one embodiment of the present invention enables the implementation of the solution to the relational model that currently dominates the commercial DBMS world.

Although for storage and retrieval purposes Query-type column contents are viewed as atomic types, for comparison purposes, Query-type values should be viewed as relations. Since a Query-type value is an intentional description of a virtual relation, the functionality needed is the one that allows one to check whether certain values exist in the relation described by a Query-type value. If they do, it is said that the Query-type value references these values.

Consider Definition 1.1, which states, for a relation R with a Query-type column Q, let t be a tuple of that relation and q the value of that tuple on column Q. Assume that A is the set of attributes of the result relation eval(q). If $v_1, \ldots, v_n$ are atomic values and $A_1, \ldots, A_n$ are attribute names, expression $R.Q[A_1, \ldots, A_n] \doteq [v_1, \ldots, v_n]$ evaluates to true for R.Q=q if the following conditions are satisfied.

1. $\forall i=1 \ldots n$ $A_i \in A$, and
2. $\exists t' \in$ eval(q) such that $t'[A_i]=v_i$, $\forall i=1 \ldots n$.

In one example, assume that a data administrator would like to know what data sources have contributed to the integration with some data about New Jersey. This translates to selecting from the Provenance table those tuples having a Query-type value q in attribute Rf1 that references Loc 'NJ'. This can be expressed as:

select p.Source from Provenance p
where p.Rf1[Loc]≐['NJ'].

Note that the semantics of the relational select operation have not changed. The only new part is the introduction of the "≐" conditional expression (predicate) for the values of type Query. The symbol "≐" is used instead of "=" to emphasize the different user-defined type.

The values $v_1, \ldots, v_n$ in Definition 1.1 can be either constant values as is the case in the example above or relational atomic expressions that take values during query evaluation. The ability to use such expressions provides the means to form joins that are based on Query-type columns, allowing tables representing metadata to be associated to the data tables.

In one example, a data administrator has discovered that in the database in FIG. 2 the customer names starting with "A" violate the format policy and would like to know the source from where they originate. The data administrator knows that the provenance information is stored in the Provenance table where attribute Rf1 specifies the association between the data and the metadata. The data administrator issues the following query:

select p.Source from Customers c, Provenance p
where p.Rf1[Name]≐[c.Name] and c.Name LIKE 'A %'

What the query does is to select all the customers whose name starts with letter "A". For every such tuple c it checks if there is a tuple p in Provenance with a Query-type value q in p.Rf1 such that relation eval(q) has an attribute Name and there is at least one tuple in it with the value in column Name equal to the value of c.Name. If yes, then tuples c and p pair up. The answer of the above query on the instance of FIG. 2 is the tuple r\['NJDB'].

Note again that this has the same semantics as the regular SQL join operator (only the join condition is different since it is based on a Query-type column). The result of its execution if the select clause was select "*", would comprise of the attributes of Customers concatenated to the attributes of Provenance. The Query-type attribute values will be the query expression of the Query-type presented as a string.

Figure 4:
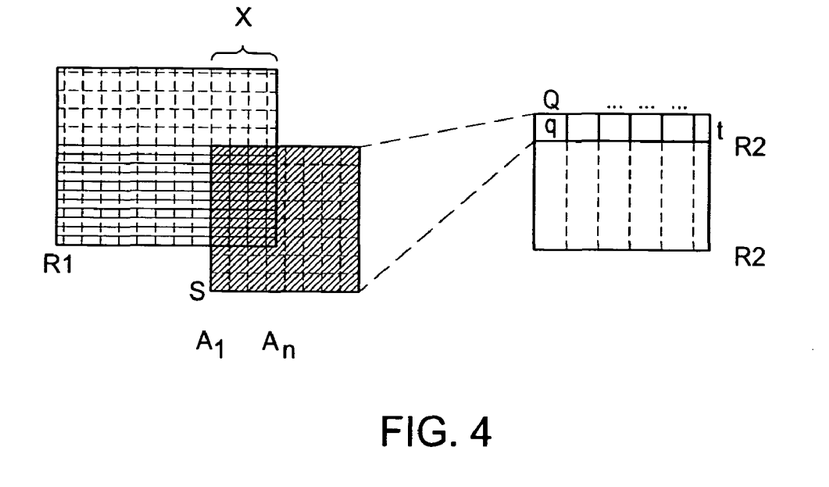
FIG. 4 is a block diagram depicting Query-type joins in accordance with the present invention.

FIG. 4 provides a visual explanation of when a tuple in one relation $R_2$ can form a join with tuples in a relation $R_1$ when the join is based on its Query-type column Q and the set of attributes $X=\{X_1, \ldots, X_n\}$ of $R_1$. This is represented through the condition $R_2.Q[A_1, \ldots, A_n] \doteq [R_1.X_1, \ldots, R_1.X_n]$. The shaded square represents the result relation S of eval(g) where q is the value of column $t_{R_2}[Q]$ of a tuple $t_{R_2}$ of relation $R_2$. A tuple $t_{R_1}$ of $R_1$ pairs up with tuple $t_{R_2}$ if all the attributes in X also exist in S, and there is at least one tuple in S with which $t_{R_1}$ agrees on all the attributes in X. Those tuples of $R_1$ that will join with tuple $t_{R_2}$ are illustrated in $R_1$ by the thick horizontal lines.

In one example, a data administrator wants to find the technicians who can verify the consistency of the circuit id of New Jersey business customers. To determine that, she is looking for the Technicians annotations that have been placed over New Jersey business customer CircuitID numbers. The association between the Customers data and its Technicians metadata information is done through a many-to-many relationship implemented by table XJ. Note that in contrast to traditional join approaches, there are no common attributes between XJ, Customers, and Technicians. The join is achieved through the intentional description of the queries stored in the two Query-type columns of table XJ.

First, a query is constructed to retrieve the New Jersey business customers.

select * from Customers c
where Loc='NJ' and c.Type='business'

It is then enhanced to also retrieve the tuples of table XJ that contain some intentional reference to the circuit ids of these customers. This is achieved through a join between the Query-type values in attribute Qc and the attribute CircuitID of Customers. The query becomes:

select * from Customers c, XJ j
where c.Loc='NJ' and c.Type='business' and
j.Qc[CircuitID]≐[c.CircuitID]

From the tuples that appear in XJ, the first is for residential customers, so it cannot satisfy the query specifications. The third tuple does not mention CircuitID in its select clause, so it cannot satisfy the query specifications either. The second tuple that agrees on the CircuitID attributes value with at least one tuple in the evaluation of the query $q_c$.

The result of the join between customers and XJ will also have to be associated with the Technicians tuples. This is done in a similar way through a join on column Qt of XJ and the attributes of Technicians. The final query is:

select * from Customers c, XJ j, Technicians t
where c.Loc='NJ' and c.Type='business' and
j.Qc[CircuitID]≐[c.CircuitID] and
j.Qt[Name]≐[t.Name]

If the administrator was interested in technicians that can verify either the phone and the circuit id of business customers, then the final query would have been:

select * from Customers c, XJ j, Technicians t
where c.Loc='NJ' and c.Type='business' and
(j.Qc[PhoneLine]≐[c.PhoneLine] or
j.Qc[CircuitID]≐[c.CircuitID])
and j.Qt [Name]≐[t.Name]

In this case, both the second and the third tuples of XJ would have been relevant. If the administrator was interested in technicians that can verify both the phone and the circuit id, then the final query would have been:

select * from Customers c, XJ j, Technicians t
where c.Loc='NJ' and c.Type='business' and
j.Qc[PhoneLine, CircuitID]≐[c.PhoneLine, c.CircuitID]
and j.Qt [Name]≐[t.Name]

Note that, in general, the above query is not equivalent to the following query:

select * from Customers c, XJ j, Technicians t
where c.Loc='NJ' and c.Type='business' and
j.Qc [PhoneLine]≐[c.PhoneLine] and
j.Qc[CircuitID]≐[c.CircuitID])
and j.Qt [Name]≐[t.Name]

This is because, in principle, different tuples in the extension of a query expression can satisfy the two conditions linked by the and, while in the former query the same tuple in the extension of the query expression has to satisfy the joint condition on phone number and circuit id.

One can also join two columns, each of which contains Query-type values, providing the ability to check for the existence of a common tuple in their respective result relations (i.e., joins between Query-type values).

In one embodiment, it may be assumed that one would like to know which data sources have contributed to tuples that have the same PhoneLine as tuples referenced by the NJDB source. This can be expressed as:

select p2.* from Provenance p1, p2
where p1.Source='NJDB' and
p1.Rf1[PhoneLine]≐p2.Rf1[PhoneLine]

The answer to this query will include both the tuples of the Provenance table. In particular, the second tuple will be included since q mentions PhoneLine in its select clause, and both eval(q0) and eval(q2) reference common Customers tuples.

One of the issues that has not been explicitly discussed yet is how one can know which are the right tables to join. How can one know that the information stored in a specific table is metadata information for another, and how to know that a join on a specific Query-type attribute makes sense. This question is no different from the question of finding the right join paths in a relational schema. Recall that the relational model does not disallow joins that are based on any type-compatible attributes, even if they do not necessarily make semantic sense. It is up to the user to identify the right semantics either with external knowledge or by looking at schema constraints like key/foreign key relationships. In a similar fashion, it is assumed that the catalog tables of a database management system records the Query-type attributes that exist in the database. By querying them, one can find what parts of what tables the Query-type values reference and form the meaningful joins. Note, further, that the join on Query-type values is value-based. Similar to the way it currently happens in the relational model, two tables can join provided that the join attributes are type-compatible, independently of whether the join makes sense semantically or not, which is an orthogonal issue.

Finally, since the query expressions in Query-type values may have to be executed at run time, a fundamental requirement one wants to guarantee is their syntactic correctness. Syntactic correctness can be checked at the time of the value insertion. A check function can be introduced and set to be activated upon insertion or update of a Query-type value. Its role will be to guarantee the syntactic correctness of the new or updated Query-type value. This functionality is similar to the check constraints defined on individual columns during table creation time. Also, such a function can check for the possibility of recursions in the Query-type value. Furthermore, since a Query-type is a user defined type, its contents can be retrieved, deleted, or updated in the same way as any other atomic type value.

The following section describes how Query-types can be implemented in a database management system in order to provide the ability to efficiently and effectively manage data, metadata and their association in a unified way. A highlight of this approach is that it builds on existing relational database technology that makes it possible to build on top of modern commercial database management systems.

Alternative mechanisms to implement Query-types and Query-type joins in modern relational databases are disclosed. First, a pure rewriting-based strategy is presented. Then, index structures on the Query-type attributes, which are referred to as Query-indexes, are described in a manner in which they can be used to speed up query evaluation.

A system which supports one embodiment of the present invention may comprise of two main components. One is a set of auxiliary tables that are used to facilitate query answering involving the Query-type values. These tables can be considered part of the catalog schema, thus they do not appear as part of the database schema presented to the user. Query answering is performed by the second component which is a query preprocessor. Its role is to identify the parts of the query that are referring to Query-type columns and rewrite them to expressions that use the auxiliary tables. The outcome of the preprocessor is a query in standard SQL that can be executed by the database management system. The result of the query is a relation as expected. Query-type column values are presented as strings by default, but additional functions can be defined to transform them to other forms.

A first step in supporting queries as values is the introduction of a new user-defined type called Query. The type is defined as an extension of the string atomic type, in order to store the query expressions.

A critical task for the query processing system is to be able to identify and use in a declarative fashion the attributes of the eval(g) relations described by the query expressions in the Query-type values. The functionality needed here is the one provided by the UNPIVOT operator that turns the attribute names of a table into data values of a column, so that the select relational operator can be applied on them. Unfortunately, the UNPIVOT operator cannot be used for Query-type values since it can only be applied on relational schemas that the database is aware of. To overcome this limitation, two auxiliary tables are introduced, whose role is to record that information: QTypeValues and AttrTbl.

The QTypeValues table associates an integer-valued unique identifier for each Query-type value, which is identified using a combination of the (metadata) table name, the column name, and record identifier of the tuple in which the Query-type value appears.

For each Query-type value that exists in the database, and for each attribute name of its virtual relation, there is one tuple in table AttrTbl, which contains the unique identifier of the Query-type value (from the QTypeValues table), and records an attribute name of its virtual relation.

Figure 5:
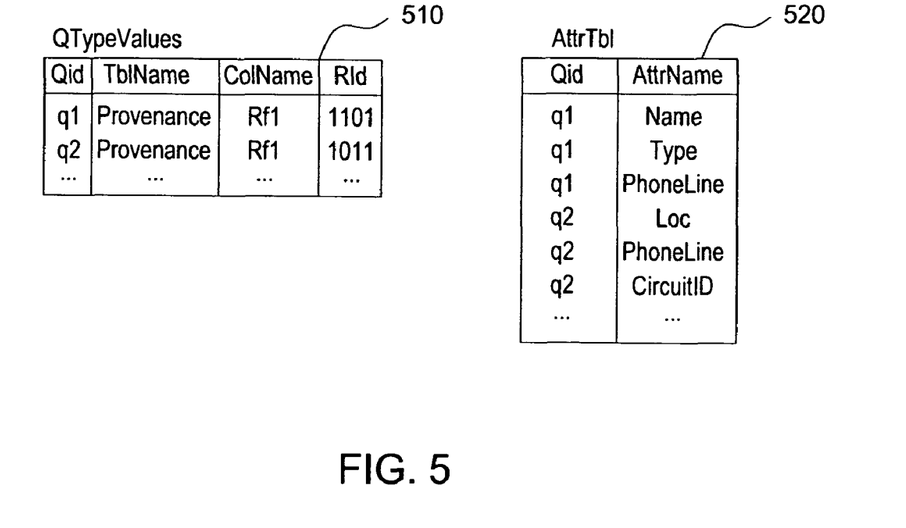
FIG. 5 depicts exemplary auxiliary tables for Query-type values.

FIG. 5 illustrates part of the contents of the auxiliary tables QTypeValues 510 and AltrTbl 520, that record the information for the two tuples of table Provenance as described in FIG. 2.

Having information about the eval(q) relation attributes for the query expression q of every Query-type value recorded, user queries involving (the newly introduced) conditions on Query-type columns can be evaluated. There are different strategies that can be followed, each one with its own advantages and disadvantages. Assume that a user query has a condition of the form $S.a[A_1, \ldots, A_n] \doteq [v_1, \ldots, v_n]$. One approach is to ignore the condition initially and evaluate the rest of the query as usual. Then for every variable binding that is found to be satisfactory, find the Query-type value to which expression S.a evaluates, the constant values to which expressions $v_1, \ldots, v_n$ evaluate, and test whether the conditions in Definition 1.1 are satisfied. Checking these conditions means evaluating the query expressions of the Query-type values each time. Thus, this approach is preferable in the case where the variable bindings found to satisfy the remaining part of the user query are highly selective compared to the bindings and the number of Query-type values that satisfy condition $S.a[A_1, \ldots, A_n] \doteq [v_1, \ldots, v_n]$.

An alternative approach is to start from condition $S.a[A_1, \ldots, A_n] \doteq [v_1, \ldots, v_n]$ by first finding all the Query-type values in column S.a whose query expression select clause specifies each attribute name in the set $A_1, \ldots, A_n$. For each Query-type value that passes this first test, all the variable bindings $[v_1, \ldots, v_n]$ that satisfy condition $S.a[A_1, \ldots, A_n] \doteq [v_1, \ldots, v_n]$ are computed, and for each one of them, it is checked whether the rest of the conditions specified in the user query are also satisfied. This approach is preferable if the number of Query-type values that pass the first test and the variable bindings that satisfy condition $S.a[A_1, \ldots, A_n] \doteq [v_1, \ldots, v_n]$ is much smaller than those bindings that satisfy the other conditions that exist in the user query.

In one embodiment, consider the query
select p.Source from Customers c, Provenance p
where p.Rf1[Name]$\doteq$[c.Name] and c.Name LIKE'A %' which was introduced previously. The first approach suggests to ignore the condition on p.Rf1, find all the customers with a name starting with A and make all the possible pairs with the Provenance tuples. For each such pair, take the Query-type value in column Rf1 of Provenance. Test whether the evaluation of that query would have contained a column Name. This is done either by analyzing its select clause, or by performing a lookup on table AttrTbl where this information has been recorded. If the Query-type value fails to pass the test, the pair of Customers and Provenance tuple is rejected. If not, the query expression is evaluated, and it is checked whether in the result relation there is a tuple with a value v in column Name equal to the value in the Name attribute of the customers tuple (this is the value to which expression c.Name evaluates). If this test is also passed the value of attribute Source is reported to the user. The drawback here is that the Query-type value expressions will have to be evaluated multiple times.

The second approach suggests to evaluate each query that appears in column Rf1 first, and check whether it has an attribute Name in its result set. For those that do, select the values that appear in that attribute and build a set of names. Then, the remainder of the query can be evaluated where instead of condition p.Rf1[Name]=[c.Name], it is now required that the value to which expression c.Name evaluates exists in the set of names that was constructed. The drawback here is that the set of names may be really large, but only a few satisfy the condition about starting with A, which means that many query expression evaluations could have been avoided.

A given approach to implement depends on the specific query that is executed. The decision on what to follow should not be made without some data statistics like those kept by the database management system. Unfortunately, these statistics are not always available to external applications. For that, an attempt to rewrite the query in such a way that the database engine is able to take the right decisions based on its data statistics information is made.

One issue in this process is that the expressions of the Query-type values are not part of the query provided by the user or the application. They are "hidden" as values in the database. Thus, the query engine cannot use them when deciding the evaluation and optimization strategy. To overcome this issue, a preprocessing step that has two main goals is introduced.

The first goal is to check the satisfaction of the first condition in Definition 1.1. As explained, such a check could not be performed by the query engine since the attributes are not explicitly mentioned in the user query but are encoded in the select clause of the Query-type value expressions. This preprocessing step can be seen as an UNPIVOT operation followed by a relational selection on the attribute names. The difference is that instead of being applied on the materialized tables of the database, it is applied on the virtual relations specified by the query expressions in the Query-type values.

The second goal is to expose these query expressions of the Query-type values to the database optimization engine, by making them part of the query that the user or the application has posed. That way, the query optimizer will be able to balance all the factors and, based on the information that the DBMS has about data distributions and value cardinalities, it will take the most promising decision for the task at hand.

Once this preprocessing step is done, the $\doteq$ condition can be removed from the modified user query expression. A detailed description of how this is achieved is described as follows. Namely, consider a user query of the form $Q_u$: select $\exp_1^u, \ldots, \exp_g^u$ from $R_1^u, \ldots, R_h^u, T$
where $\text{cond}_1^u$ and ... and $\text{cond}_f^u$ and
T.a $[A_1, \ldots, A_n] \doteq [e_1, \ldots, e_n]$.

Step 1: The first step is to identify which of all the Query-type values in attribute T.a have attributes named $A_1, \ldots, A_n$ in the relation obtained by the evaluation of their query expression. This is achieved through the following query on the auxiliary tables AttrTbl and QTypeValues:

select tv.RId
from QTypeValues tv, AttrTbl $at_1$, AttrTbl AttrTbl $at_2, \ldots,$ AttrTbl $at_n$
where tv.TblName='T' and tv.ColName='a'
and tv.qid=$at_1$.qid and $at_1$.AttrName='$A_1$'
and tv.qid=$at_2$.qid and $at_2$.AttrName='$A_2$'
...
and tv.qid=$at_n$.qid and $at_n$.AttrName='$A_n$'

Step 2: From all the Query-type values identified in Step 1, only those whose query evaluation has a tuple with value $e_j$ in attribute $A_j$, $\forall_j = 1 \ldots n$, have to be kept.

Let $q_i$ be a Query-type value identified through the first step. A new query $Q_i$ is constructed as follows:

$Q_i$: select *
from $(q_i)$ AS R
where $R.A_1 = e_1$ and ... and $R.A_n = e_n$

This query answers the question of whether eval($q_i$) has a tuple with a value $e_j$ in attribute $A_j$, where j ranges between 1 and n. If the result is an empty set, Query-type value $q_i$ does not satisfy condition T.a $[A_1, \ldots, A_n] \doteq [e_1, \ldots, e_n]$. Since there is no interest in the actual results of query Q, but only in finding whether it returns an empty set or not, the select clause can be rewritten to select TOP 1 '1'. The constant value '1' is a random constant and the 'TOP 1' clause instructs the query processor to return only the first tuple in the result set with some potential saving in execution time.

Step 3: Once the set of queries $Q_i$, have been constructed for the Query-type values returned during Step 1, condition T.a $[A_1, \ldots, A_n] \doteq [e_1, \ldots, e_n]$, in the user query can be replaced by a condition that tests whether the Query-type value of attribute T.a is one of those computed during Step 1, and if so, that its respective query $Q_i$ returns a non-empty result set. To accomplish that, the union feature of SQL queries is exploited. After the replacement of condition T.a $[A_1, \ldots, A_n] \doteq [e_1, \ldots, e_n]$, query $Q_u$ becomes:

select $\exp_1^u, \ldots, \exp_g^u$ from $R_t^u, \ldots, R_h^u, T, (q_1)$ AS R
where $\text{cond}_1^u$ and ... and $\text{cond}_f^u$ and
T.RId=$rid_1$ and ($R.A_1 = e_1$ and ... and $R.A_n = e_n$)
Union
select $\exp_1^u, \ldots, \exp_g^u$ from $R_1^u, \ldots, R_h^u, T, (q_2)$ AS R
where $\text{cond}_1^u$ and ... and cond and
T.RId=$rid_2$ and ($R.A_1 = e_1$ and ... and $R.A_n = e_n$)
Union
...
Union
select $\exp_1^u, \ldots, \exp_g^u$ from $R_1^u, \ldots, R_h^u, T, (q_1)$ AS R
where $\text{cond}_1^u$ and ... and $\text{cond}_f^u$ and
T.RId=$rid_i$ and ($R.A_1 = e_i$ and ... and $R.A_n = e_n$)

To avoid the nested queries, the above expression can be rewritten by embedding the from and where clause of the $q_i$ query in the respective clauses of the union query component they appear in. For instance, if query $q_i$ is:

select $e'_p$ AS $A_p$, $e'_o$ AS $A_o, \ldots, e'_k$ AS $A_k$, $e'_r$ AS $A_r$
from $S_1, \ldots, S_s$
where $\text{cond}_1$ and ... and $\text{cond}_1$ the last component of the union expression can become:

select $\exp_1^u, \ldots, \exp_g^u$ from $R_1^u, \ldots, R_h^u, T, S_1, \ldots, S_s$
where $\text{cond}_1^u$ and ... and cond and
T.RId=$rid_i$ and ($e'_1 = e_1$ and ... and $e'_n = e_n$) and $\text{cond}_1$ and ... and $\text{cond}_1$ All the operators in the rewritten query are standard SQL operators, thus, it can now be sent to the database management system for execution. Furthermore, since the query expressions $q_i$ of the Query-type values are explicitly mentioned in the query, the optimizer will be able to take them into consideration, and come up with the best evaluation strategy.

In one example, the following user query
select p.Source from Customers c, Provenance p
where p Rf1[PhoneLine]≐[c.PhoneLine]
and c.Name LIKE'A %'
will get the form:
select p.Source
from Customers c, Provenance p, Customers c2
where c.Name LIKE'A %' and p.RId=r1 and
   c2. Loc='NJ' and c2.PhoneLine=c.PhoneLine
Union
select p.Source
from Customers c, Provenance p, Customers c2
where c.Name LIKE'A %' and p.RId=r2 and
   c2.Type='business' and c2.PhoneLine=c.PhoneLine
Union
. . .

The . . . symbol in the query denotes additional cases that may exist due to other Query-type values of attribute Rf1 in table Provenance that may qualify but do not appear in the portion of the relation illustrated in FIG. 2.

An alternative approach is to define virtual views based on the expressions of every Query-type value that exists in the database. The rewriting can then refer to the virtual relation described by the Query-type value through the respective view.

Query evaluation based on the query rewriting approach described in the previous section is expected to be efficient when the rewritten query has only a few conjuncts, i.e., when the number of Query-type values in attribute T.a that are identified in Step 1 is small. If the metadata table contains a large number of Query-type values, all of which have attributes named $A_1, \ldots, A_n$, then each of these Query-type values would need to be evaluated, even if $[e_1, \ldots, e_n]$ were a tuple of constants. To further prune out "irrelevant" Query-type values in attribute T.a, the values present in the relations obtained by evaluating the queries would need to be used.

In one embodiment, an approach based on maintaining indexes on the Query-type values, which are referred to as Query-indexes, is presented for this purpose. The Query-indexes can be easily realized using relational tables and B-tree index structures available in commercial relational database management systems.

In one embodiment, the best possible index from the perspective of minimizing the query execution time would be an index that given any n-tuple of attributes $[A_1, \ldots, A_n]$ and any n-tuple of values $[v_1, \ldots, v_n]$ would precisely identify the Query-type values in attribute T.a that satisfy the conditions of Definition 1.1.

A more space-efficient alternative is to build multiple single attribute Query-indexes that given any attribute $A_i$ and any value $v_i$ would precisely identify the Query-type values in attribute T.a that satisfy the conditions of Definition 1.1. Such an approach has both advantages and disadvantages.

The key disadvantage is that given an n-tuple of attributes $[A_1, \ldots, A_n]$ and an n-tuple of values $[v_1, \ldots, v_n]$, one cannot precisely determine the desired Query-type values, using the single attribute Query-indexes. The reason is that even if each $v_i$ appeared in attribute $A_i$ of a query q's relation $R_q$, they may not all be present in the same tuple of $R_q$.

However, the single attribute Query-indexes can be used as an effective filter, since they may have false positives when n>1, but they do not have false negatives. For n=1 there are neither false positives, nor false negatives.

The key advantages of maintaining multiple single attribute Query-indexes over the covering index on all attributes are the significantly lower space cost, and the consequently lower cost of constructing and maintaining such indexes. Notably, the reason is that even if a value $v_j$ appears in attribute A, in multiple tuples of a query q's relation $R_q$, the pair ($v_j$, q) need be indexed only once in the single attribute Query-index of $A_i$.

A simple and elegant way of implementing a single attribute Query-index on attribute $A_i$, in a commercial database system, is to (i) materialize a 3-ary relational table (val, qid, count), where the meaning of a tuple (v, q, c) in this table is that value v appears in attribute $A_i$ of c different tuples of query q's relation $R_q$, (ii) make the pair <v, q> a key for that table, and (ii) create a B-tree index on val. The count field is present merely to efficiently maintain this index under insertions, deletions and modifications to the base tables used in the definitions of the metadata queries.

Figure 6:
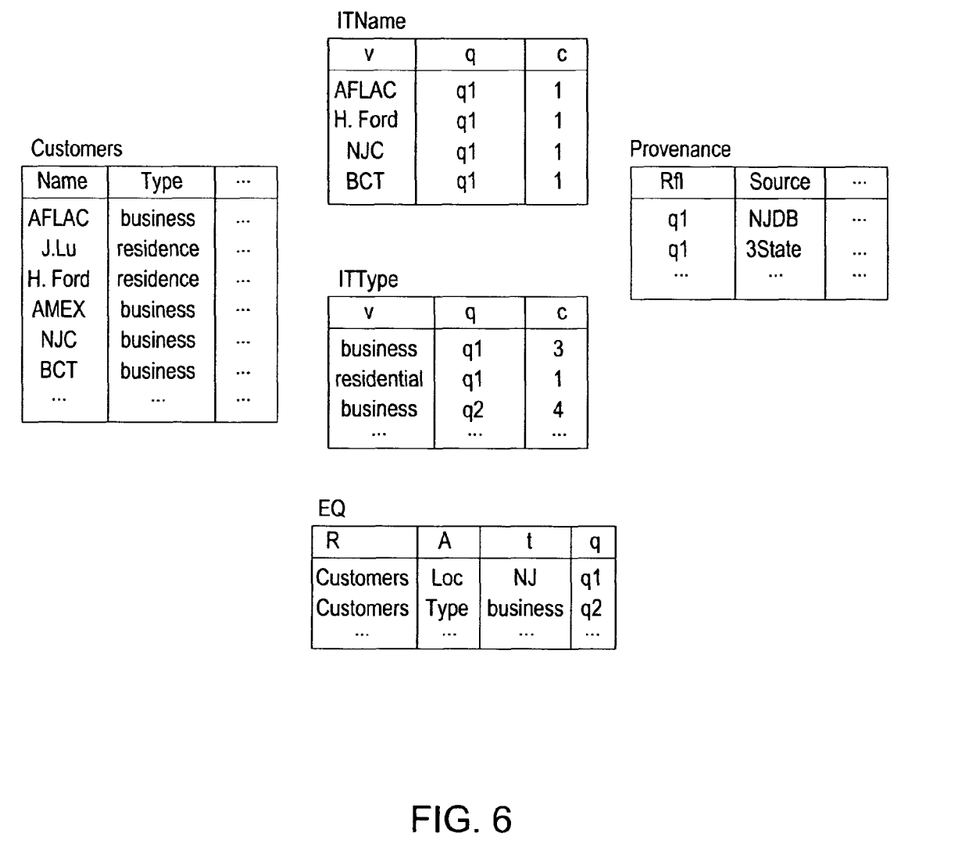
FIG. 6 depicts a Query-index realization in a relational database management system (DBMS)

In one example, the table ITName and ITType in FIG. 6 illustrate a fraction of a realization of a single-attribute index for the attributes Name and Type, respectively, of the database instance in FIG. 2. The interesting observation is that since <v, q> is a key, it is likely to have a unique index. If a Query-type join involves only one attribute (case n=1 as mentioned previously), an intelligent query optimizer can implement the join using the index without having to access the table data.

For the Query-index to be useful, it would need to be efficiently updatable as data and metadata entries are inserted, deleted and updated in the database. Suppose that the various queries in the Query-type attribute Ta are select-project queries over single tables, and their where clauses are conjunctions of conditions of the form $R.A_k \leq v_k$ and $R.A_m \geq v_m$, where $v_k$ and $v_m$ are constants. Then a condition of the form $R.A_k \leq v_k$ present in the where clause of query $q_m$ can be represented in a relational table having the schema LEQ (relation, attribute, value, quervid). Similarly, conditions of the form $R.A_m \geq v_m$ can be represented in a relational table GEQ with the same schema. When a new tuple $(t_1, \ldots, t_n)$ is inserted in relation $R(A_1, \ldots, A_n)$, one can query the relation LEQ for tuples of the form $\{(R, A_i, t, q) | t < t_i, 1 \leq i \leq n\}$ and the relation GEQ for tuples of the form $\{(R, A_i, t, q) | t > t_i, q \leq i \leq n\}$. Such tuples can be efficiently identified using standard relational indexes such as B-trees on the concatenation of the first three attributes of LEQ (or GEQ). A query q present in an identified tuple is clearly not affected by the insertion, and can be eliminated. Any query that is not eliminated has all the conditions in its where clause satisfied by the newly inserted tuple, thereby identifying the tuples that need to be inserted/modified in the Query-index.

If a new tuple is inserted in a table with a Query-type column, the query expression of the Query-type value for that column is evaluated. The values of each attribute in the result relation are used to update the respective tables of the Query-index. This is done by checking whether there is an entry with the pair (value, queryid) already in the index table. If yes, its count value is increased by 1. Otherwise, a new entry <value, queryid, 1> is inserted.

Figure 7:
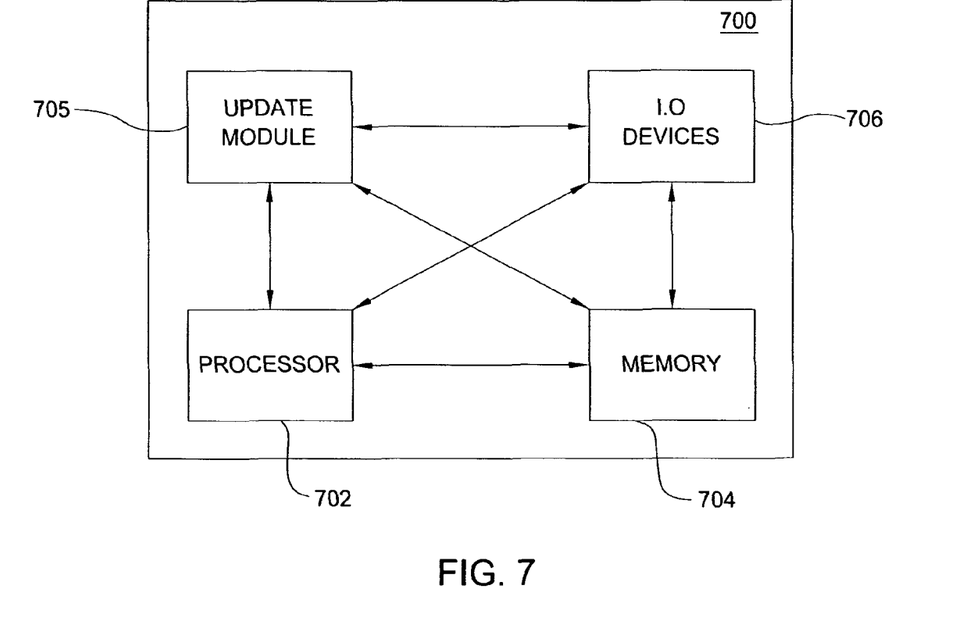
FIG. 7 is a block diagram depicting an exemplary embodiment of a computer suitable for implementing the processes and methods described herein.

FIG. 7 depicts a high level block diagram of a general purpose computer suitable for use in performing the functions described herein. As depicted in FIG. 7, the system 700 comprises a processor element 702 (e.g., a CPU), a memory 704, e.g., random access memory (RAM) and/or read only memory (ROM), a module 705 for associating query expressions, and various input/output devices 706 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 705 for associating query expressions can be loaded into memory 704 and executed by processor 702 to implement the functions as discussed above. As such, the present process 705 for associating query expressions (including associated data structures) of the present invention can be stored on a computer readable medium or carrier, e.g., RAM memory, magnetic or optical drive or diskette and the like.

There is a clear need to associate a variety of metadata with the underlying data, to understand, maintain, query, integrate and evolve databases. The present invention describes a simple, elegant approach to uniformly model and query data and arbitrary metadata. Aspects of the present invention include: (1) the relational model augmented with queries as data values is a way to uniformly model data, arbitrary metadata and their association, and (2) relational queries with a join mechanism augmented to permit matching of relations specified by Query-type values, instead of only atomic values, is an elegant way to uniformly query across data and metadata. The present invention implements this approach by providing a mechanism for recording metadata into a database without having to alter existing tables. User queries are evaluated by rewriting them to standard SQL queries in a way that can be optimized using available data statistics.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for associating a query expression, comprising:
   adding a metadata table to a database, wherein a portion of the metadata table comprises the query expression; and
   associating the query expression to a value from a tuple belonging to an existing data table of the database, wherein the existing data table is unmodified, wherein a second portion of the metadata table comprises an element of a tuple that is not listed in the existing data table, wherein the element of the tuple that is not listed in the existing data table comprises an additional query expression, and wherein the metadata table is configured to be queried independently from the existing data table by a user.

2. The method of claim 1, wherein the query expression is associated to the value by a relationship defined by a select clause corresponding to the query expression.

3. The method of claim 2, wherein the select clause comprises a join mechanism.

4. The method of claim 1, wherein the metadata table comprises a relational table.

5. An apparatus for associating a query expression, comprising:
   an application server comprising hardware configured to:
      add a metadata table to a database, wherein a portion of the metadata table comprises the query expression; and
      associate the query expression to a value from a tuple belonging to an existing data table of the database, wherein the existing data table is unmodified, wherein a second portion of the metadata table comprises an element of a tuple that is not listed in the existing data table, wherein the element of the tuple that is not listed in the existing data table comprises an additional query expression, and wherein the metadata table is configured to be queried independently from the existing data table by a user.

6. The apparatus of claim 5, wherein the query expression is associated to the value by a relationship defined by a select clause corresponding to the query expression.

7. The apparatus of claim 6, wherein the select clause comprises a join mechanism.

8. The apparatus of claim 5, wherein the metadata table comprises a relational table.

9. A computer readable medium having stored thereon a plurality of instructions, the plurality of instructions including instructions which, when executed by a processor, causes the processor to perform a method for associating a query expression, comprising:
   adding a metadata table to a database, wherein a portion of the metadata table comprises the query expression; and
   associating the query expression to a value from a tuple belonging to an existing data table of the database, wherein the existing data table is unmodified, wherein a second portion of the metadata table comprises an element of a tuple that is not listed in the existing data table, wherein the element of the tuple that is not listed in the existing data table comprises an additional query expression, and wherein the metadata table is configured to be queried independently from the existing data table by a user.

10. The computer readable medium of claim 9, wherein the query expression is associated to the value by a relationship defined by a select clause corresponding to the query expression.

11. The computer readable medium of claim 10, wherein the select clause comprises a join mechanism.

12. The computer readable medium of claim 9, wherein the metadata table comprises a relational table.

* * * * *